Aug. 21, 1956 M. SAYLOR 2,759,600
GAUGING APPARATUS
Filed Dec. 19, 1951 3 Sheets-Sheet 3
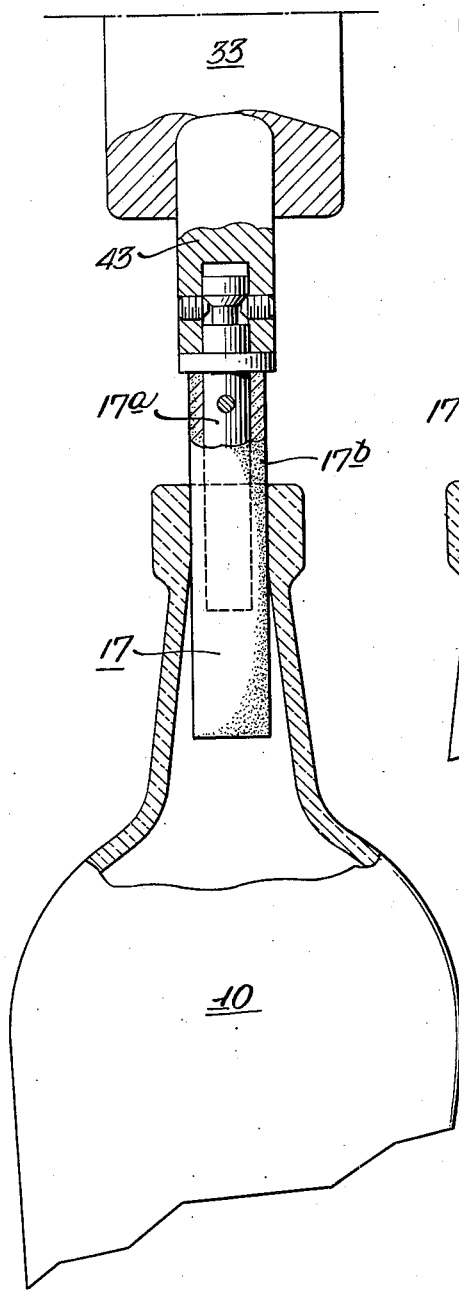
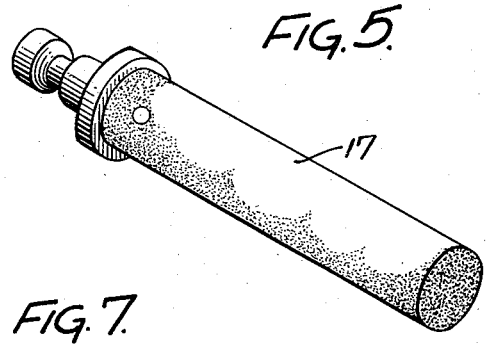
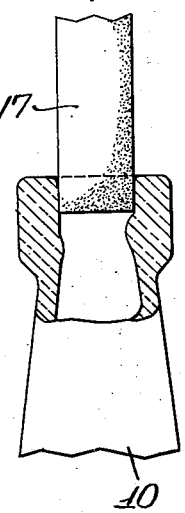
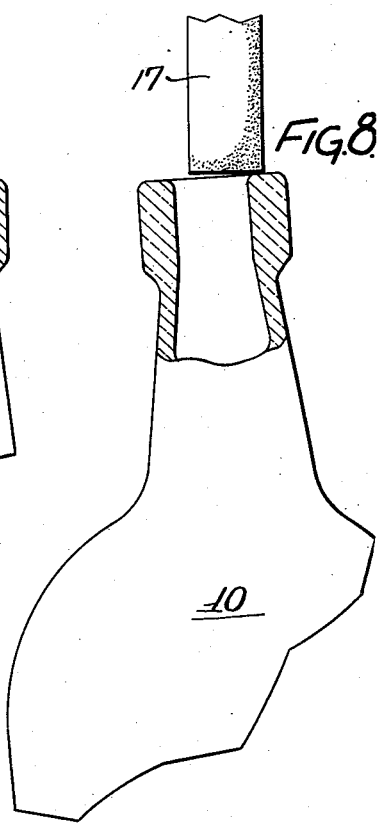
Inventor:
Murray Saylor
by his Attorneys
Howson & Howson

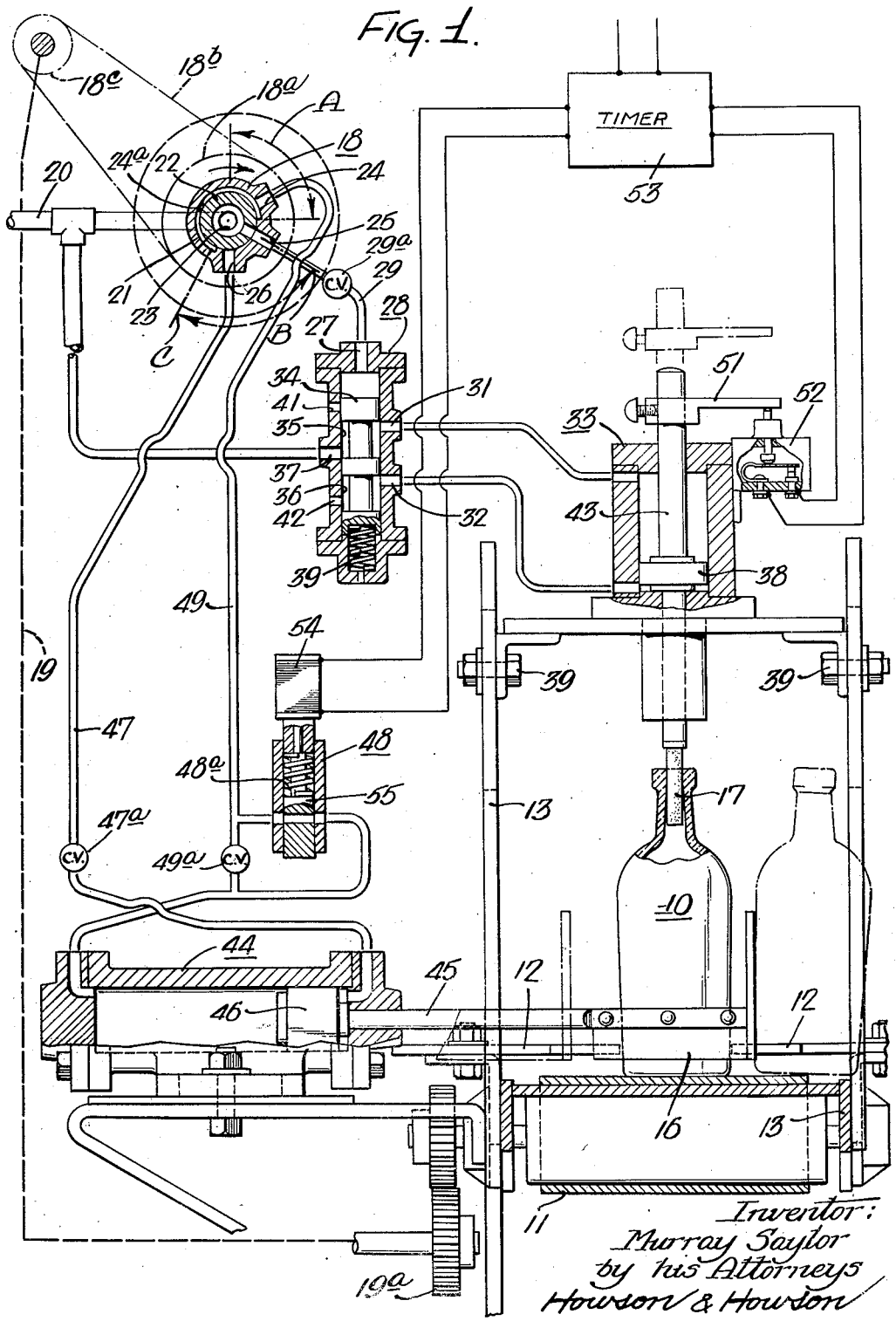

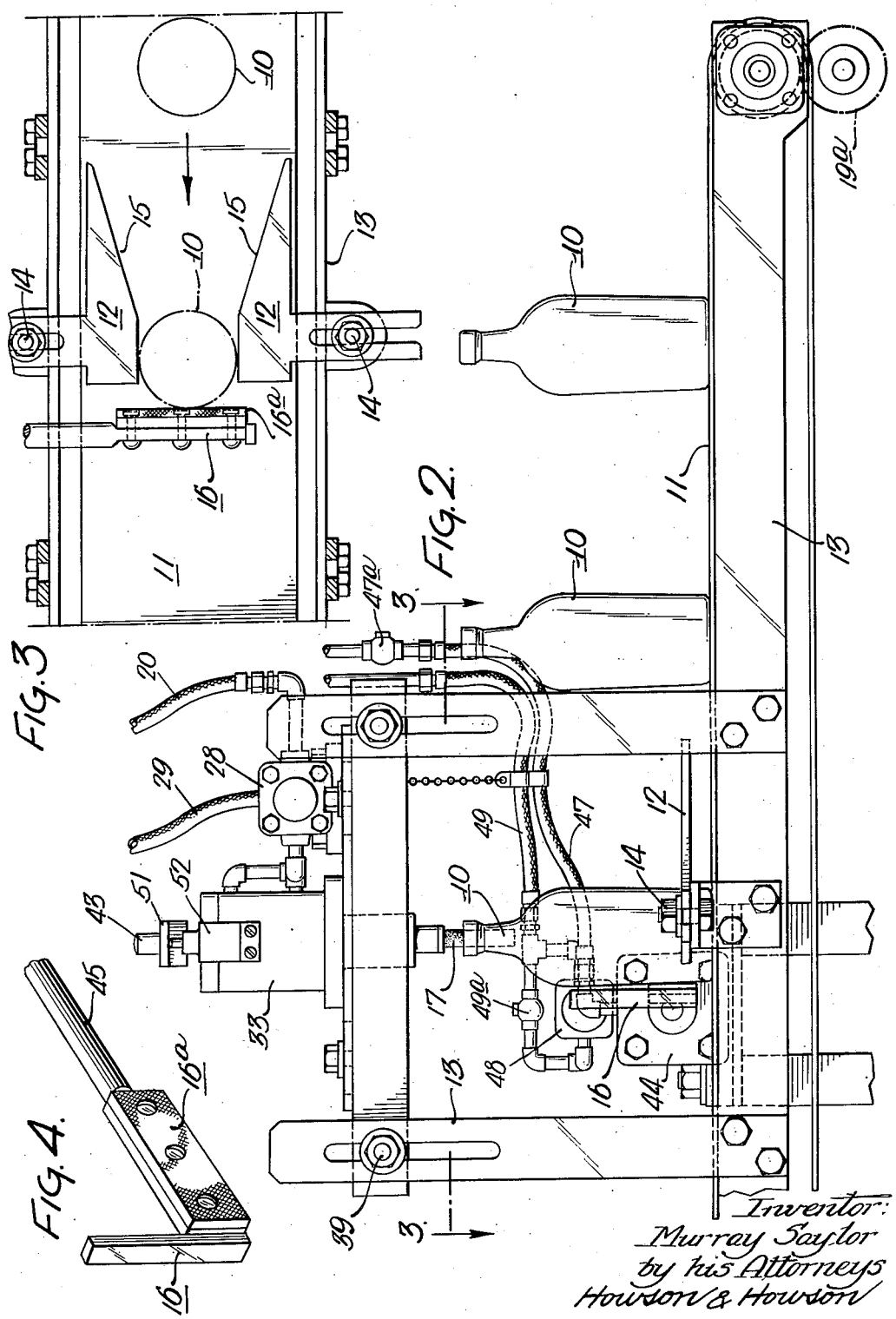

United States Patent Office 2,759,600
Patented Aug. 21, 1956

2,759,600

GAUGING APPARATUS

Murray Saylor, Royersford, Pa., assignor to Diamond Glass Company, Royersford, Pa., a corporation of Pennsylvania Application December 19, 1951, Serial No. 262,359

6 Claims. (Cl. 209—88)

The present invention relates to new and useful improvements in bottle gauging apparatus and more particularly to apparatus operable to determine whether or not the opening in a bottle or other container is the proper size and also to determine if the neck of the bottle is vertical.

In the manufacture of containers of glass and other moldable or cast materials, it is necessary that the internal neck diameter of the containers conform to predetermined standards and also that the opening through the neck of the container be vertical. This is particularly true when the container is to be filled by an automatic filling machine as the tube of the filling machine must have free and easy access within the container opening. For example, the container is formed in a casting machine and while it is still very hot, it is removed from the casting machine and placed in an annealing lehr or oven to be annealed. The annealing process is long and expensive, and it is wasteful both of time and money to permit imperfect containers to pass through the annealing lehr. Accordingly, it is desirable to inspect or gauge the containers after they leave the casting machine and before they enter the annealing lehr. Prior to the present invention, this inspection has been performed by manually inserting a gauge into the opening of every container and visually inspecting the containers to determine whether or not the neck of the container is truly vertical. The time and labor required for this manual inspection procedure adds considerably to the cost of producing the containers.

With the foregoing in mind, the principal object of the present invention is to provide novel bottle gauging apparatus which is operable to predeterminedly position a bottle relative to the gauging apparatus and automatically insert a plug of predetermined diameter into the bottle opening in order to determine whether or not the opening conforms to the required standard.

Another object of the present invention is to provide novel gauging apparatus of the type described which is operable to determine whether or not the neck of the bottle is accurately or truly vertical.

A further object of the present invention is to provide novel gauging apparatus of the character set forth which is operable automatically to reject bottles which do not conform to the required standards.

These and other objects of the present invention and the various features and details of the operation and construction thereof are hereinafter more fully set forth and described with reference to the drawings, in which:

Fig. 1 is a transverse sectional view through the bottle gauging apparatus illustrating a bottle positioned beneath the testing apparatus;

Fig. 2 is a side elevational view of bottle gauging apparatus made in accordance with the present invention;

Fig. 3 is a sectional view taken on line 3—3, Fig. 2, illustrating the means for positioning the bottles beneath the gauging apparatus;

Fig. 4 is an enlarged perspective view of the ware positioner and rejecter;

Fig. 5 is a perspective view of the plug gauge used for testing the bottle opening;

Fig. 6 is a fragmentary sectional view illustrating the plug gauge in position in a bottle which meets the necessary standards;

Fig. 7 is a fragmentary sectional view illustrating the plug gauge attempting to enter a bottle having a restricted neck opening; and Fig. 8 is a fragmentary sectional view illustrating the plug gauge attempting to enter a bottle having a neck which is not vertical.

Gauging apparatus made in accordance with the present invention is designed to be positioned intermediate of a bottle casting machine and an annealing oven. As the bottles or other objects to be tested are removed from the casting machine, they are placed on a conveyor at predetermined intervals and carried by the conveyor to the gauging apparatus where they are momentarily stopped and have a plug gauge inserted in their neck opening. If the bottles meet a predetermined standard, they are permitted to continue along the conveyor to apparatus which removes the bottles from the conveyor and places them in the annealing oven. On the other hand, if the bottles do not meet a predetermined standard, they are automatically removed from the conveyor.

Referring more specifically to the drawings, reference numeral 10 designates generally a bottle or other container which is carried by a continuously operating endless conveyor 11 through the gauging apparatus. In the present instance, the gauging apparatus of the present invention is positioned intermediate a bottle casting machine and an annealing oven for the purpose of testing the bottles prior to their insertion in the annealing oven. The bottles are positioned on the continuously moving conveyor 11 at predetermined intervals by positioning apparatus (not shown) which is synchronized with the speed of the conveyor and with the operating cycle of the gauging apparatus. This construction permits simplification of the controls of the gauging apparatus as more fully described hereinafter.

In accordance with the present invention, means are provided to position the bottles centrally of the conveyor and to momentarily stop the bottles beneath the gauging apparatus. To this end, a pair of guide plates 12, 12 are adjustably mounted as indicated at 14, 14 in Fig. 3, at opposite sides of the conveyor 11 to a frame 13 which supports the conveyor 11 and gauging apparatus. The guide plates 12, 12 extend inwardly towards the central portion of the conveyor and terminate in forwardly converging guide surfaces 15, 15 which direct the bottles towards the longitudinal center line of the conveyor 11. The adjustable mounting of the guide plates, as indicated at 14, 14, Fig. 3, permits the guide plates to be positioned transversely of the conveyor 11 to accommodate to different size containers. A ware positioner and ejector 16 is adapted to be momentarily projected into the path of the objects on the conveyor to momentarily stop the objects beneath the gauging apparatus as more fully described hereinafter. The forward surface of the positioner 16 is provided with a heat resistant pad 16a, formed, for example, of asbestos or like material to prevent chilling of the containers as they contact the positioner 16.

After the object to be tested is stopped beneath the gauging apparatus, a plug gauge 17 is quickly lowered and raised, and if the bottle meets the required standard, the plug gauge enters and is removed from the neck of the bottle and the bottle is permitted to advance. On the other hand, if the bottle neck is restricted in any way or if the plug gauge is not permitted to enter the bottle neck, the bottle is automatically rejected from the conveyor 11 as more fully described hereinafter.

As previously described, the gauging apparatus of the present invention is designed to be positioned intermediate of a bottle casting machine and an annealing oven. Accordingly, the containers will be very hot as they enter the gauging apparatus and means must be provided to prevent the plug gauge 17 from chilling the containers. In addition, glass is a very hard and abrasive material and the plug gauge must be constructed of a wear resistant material which is proof against distortion. To this end, the plug gauge 17 is constructed, for example, as illustrated in Fig. 6, and comprises a central steel core 17a having a covering or sheath 17b which is molded of a heat and wear resistant plastic material containing asbestos fibres.

In accordance with the present invention, operation of the gauging apparatus is controlled by means of a timing valve 18. The timing valve 18 may be of the rotary type, as illustrated schematically in Fig. 1, which comprises a stationary casing 21 and a rotary valve element 22 positioned centrally of the casing 21. Air is admitted, under pressure, to a central opening 23 of the rotary valve element 22 from the main feedline 20, and is permitted to escape alternately through outlets 24, 25 and 26 in the valve casing. The timing valve 18 is actuable to control the operation of the gauging apparatus and is synchronized with the speed of the conveyor so that the plug gauge 17 is lowered and raised each time that a bottle is properly positioned beneath the gauging apparatus. As shown schematically in Fig. 1, the timing valve 18 may be actuated by means of a sprocket 18a driven by a chain 18b from a smaller sprocket 18c which in turn has a mechanical driving connection 19 to a gear 19a driven by the conveyor drive mechanism. In the illustrated embodiment of the present invention, the rotary valve element rotates in the clockwise direction with respect to Fig. 1, thereby first permitting air to escape through the outlet 24. The outlet 24 is then closed and air is permitted to escape through the outlet 25 which is then closed and outlet 26 is opened. An elongated slot 24a is associated with the outlet 24 to permit the outlet 24 to remain open for a relatively long period of time for the purpose more fully described hereinafter.

The outlet 25 communicates with an inlet opening 27 in a sliding spool valve 28 by means of the air line 29. The spool valve 28 in turn has a pair of outlet openings 31 and 32, therein, which permit air, under pressure, to be admitted to the upper and lower ends respectively of an air cylinder 33. Positioned interiorly of the spool valve 28 is a piston 34 formed, for example, as illustrated in Fig. 1, which provides upper and lower pressure chambers 35 and 36, respectively, in the spool valve 28. When the timing valve 18 is in the position illustrated in Fig. 1, wherein air, under pressure, is permitted to pass through the outlet opening 25 and is admitted to the top of the piston 34, the piston is forced downwardly, thereby permitting air under pressure to pass through the upper pressure chamber 35 in the spool valve 28. The air enters the upper chamber 35 through an inlet opening 37 which communicates with the feed line 20, passes through the upper chamber 35 and through the outlet 31 into the upper end of the air cylinder 33. By this construction, the piston 38 of the air cylinder 33 is forced downwardly when air is permitted to escape through the outlet opening 25 to overcome the bias of a spring 39 compressed between the piston 34 and the housing of the valve 28. The air below the piston 38 escapes through the ports 32 and 42 of the valve 28.

Further rotation of the valve element 22 will shut off the air supply through the opening 25 to the upper surface of the piston 34, and permit air to be exhausted from the chamber communicating with the upper surface of the piston 34, for example, through the check valve 29a in the air line 29. The check valve 29a has a normally closed port to the atmosphere which opens when the back pressure in the line 29 exceeds a predetermined value. In this position of the timing valve 18, the piston 34 of the spool valve 28 is forced upwardly by means of the spring 39, thereby permitting air, under pressure, to be passed through the lower pressure chamber 36 and out of the outlet opening 32, which, in turn, communicates with the lower surface of the piston 38 of the air cylinder 33. Thus, in this position of the timing valve 18, the piston 38 is raised. When air under pressure is forced into one end of the air cylinder 33, the other end of the air cylinder 33 is opened to the atmosphere through the exhaust opening 41 in the spool valve 28. As illustrated in Fig. 1, piston rod 43 of the air cylinder 33 extends out through both ends of the air cylinder 33 and has the plug gauge 17 removably secured to its lower end, for example, as illustrated in Fig. 6. By this construction, rotation of the valve element 22 of the timing valve 18, will cause the piston 38 in the air cylinder 33 to make a rapid downward and upward stroke, thereby momentarily inserting the plug gauge 17 into the neck of a bottle which is positioned beneath the plug gauge. The piston rod 43 has at its upper extremity a switch-operating member 51 which is positioned to engage and actuate a switch 52 for controlling a timer 53 for a purpose more fully described hereinafter. The air cylinder 33 is carried by a platform adjustably mounted to the frame 13, for example, as indicated at 39, 39 in Fig. 2, to permit relative vertical positioning of the plug gauge 17 with respect to the conveyor 11 to accommodate bottles of various heights.

The timing valve 18 also controls the operation of the ware positioner and ejector 16 through the medium of an ejector cylinder 44. The ware positioner and ejector 16 is secured to one end of a piston rod 45 which extends outwardly through the forward end of the ejector cylinder 44. The ejector 16 is actuated to its forward and rearward limit positions by admitting air under pressure to the rear and forward ends of the ejector cylinder 44. Admittance of air to the ejector cylinder is controlled by the timing valve 18 and solenoid valve 48, as will be more fully described hereinafter.

Rotation of the valve element 22 of the timing valve 18 in a clockwise direction from the position illustrated in Fig. 1, cuts off the supply of air to the line 29 and causes the piston 38 of the cylinder 33 to retract upwardly, as described above. Further rotation of the valve element 22 admits pressure air to the outlet 26 in the valve casing 21. The air from the outlet 26 passes through the feed line 47 to the forward end of the ejector cylinder 44, thereby exerting retractive pressure on the forward face of the piston 46, causing the ejector 16 to be retracted to the position illustrated in broken lines in Fig. 1. During the retraction stroke of the ejector 16, air is exhausted from the rear chamber of the cylinder 44 to the atmosphere through the check valve 49a which has a normally closed port to the atmosphere which opens when the back pressure from the cylinder 44 exceeds a predetermined value. Thus, the ejector 16 is retracted after the plug gauge 17 is withdrawn from the bottle, to permit the conveyor 11 to carry the bottle 10 past the gauging station.

When the valve element continues its rotation to cut off the supply of air to the opening 26, the piston 46 in the cylinder 44 is retained in its retracted limit position until air is admitted behind the piston to advance it. Further advancement of the valve element 22 of the timing valve 18 puts the line 20 in communication with the opening 24 by means of the elongated slot 24a. However, air is not admitted behind the piston 46 until the timer 53 operates to energize and open a timing valve 48 positioned in the line leading from the outlet 24 to the rear chamber of the cylinder 44.

The timer 53 operates to energize the valve 48 after a predetermined time delay and maintains the solenoid 54 energized for a predetermined period, for example, a period corresponding to 90 degrees of rotation of the timing valve 18. This period of energization of the solenoid 54 is indicated by the broken lines A on the timing valve shown in Fig. 1. Energization of the solenoid 54 opens the valve 48 to admit pressure air to the rear chamber of the cylinder 44. The air advances the piston to position the ejector 16 across the conveyor, as shown in full lines in Fig. 1. The advance of the piston 46 exhausts air from the forward cylinder chamber.

Further rotation of the valve element 22 cuts off the supply of pressure air to the line 49 simultaneously with the deenergization of the solenoid 54 at the end of the period A, but the piston 46 remains in its forward position until the pressure air is admitted to the forward chamber of the cylinder by the line 47. Thus, the ejector 16 is maintained in a position overlying the conveyor 11 to interrupt the travel of a bottle 10 and position it between the guide elements 12, 12 in registry with the plug gauge 17, for example as shown in Fig. 3. Further rotation of the valve element 22 introduces pressure air to the spool valve 28 to cause the plug gauge 17 to enter the bottle 10 now positioned therebelow against the ejector 16. Further rotation of the valve element 22 causes the plug gauge to be retracted and the above-described operation is repeated.

The present invention provides means for ejecting a bottle if it prevents the plug gauge 17 from advancing to its lower limit position. It should be noted that when the plug gauge 17 enters the bottle 10, the switch operator 51 operates the switch 52 to start the timing cycle of the timer 53. Thus, the start of the timing cycle is indicated at B in Fig. 1. The timer maintains the valve 48 de-energized and closed until the portion of the cycle indicated at A in Fig. 1 is reached.

In accordance with the invention, if the gauge 17 is held against downward movement, for example by an imperfection in the bottle, the switch operator 51 fails to operate the switch 52 so that a new timing cycle is not started at point B. In this event, the timer continues to maintain the valve 48 de-energized until the cycle of the timer runs out at point C as shown in Fig. 1. Thus, the cycle of the timer is more than 360 degrees of the cycle of the timing valve 18. The timer does not affect the operation of the timing valve 18 and the valve element 22 admits pressure fluid to the line 47 to cause retraction of the ejector 16. However, immediately after retraction of the ejector 16, and upon further rotation of the valve element 22, the timer completes its cycle to cause energization of the solenoid 54 and consequently, opening of the valve 48. Thus, when pressure fluid is admitted to the line 49 by the operation of the valve element 22, the pressure air is admitted to the rear cylinder chamber of a cylinder 44 causing the piston 46 to advance and thereby engage the bottle 10 which the ejector has just permitted to advance with the conveyor belt 11. Thus, upon further advance of the valve element 22, the bottle is ejected from the conveyor by the ejector 16, for example as indicated in broken lines in Fig. 1.

The timer 53 is of the type in which, when the timing cycle runs out, another cycle starts only when the timer is actuated by the switch 52. Thus, after the valve 48 is opened to eject the imperfect bottle, the valve remains open and the operation continues as normal until the point B is reached at which time a new timing cycle is commenced by reason of the closure of the switch 52. If, because of a defective bottle, the switch 52 is not closed, the timer remains inoperative and the solenoid is held energized. When the valve element 22 passes into registry with the slot 24a, the defective bottle 10 is rejected by advancement of the ejector 16. A typical timer which may be used to accomplish this result is the "non-synchronous electronic timer, type 30CR3 Model 1000" manufactured by Photoswitch, Inc., Cambridge, Mass.

Thus the timing cycle is prevented from running out and is restarted if the plug gauge 17 is permitted to fully enter the neck of the bottle being tested. To this end the switch operating member 51 is operable to momentarily close the switch 52 when the piston rod 43 reaches its lower limit position. Actuation of the switch 52 prevents ejection of the bottles 10 from the conveyor 11 as described. If, for example, the opening in the neck of the bottle is restricted, as illustrated in Fig. 7, or the neck of the bottle is not exactly vertical as illustrated in Fig. 8, the piston rod 43 cannot make a complete downward stroke and the switch 52 will not be closed. If the switch 52 is not closed when air is admitted to the upper surface of the piston 38 the timing cycle controlled by the timer 53 runs out and the solenoid operated valve 48 is energized thereby causing a rapid forward stroke of the ware positioner and ejector. If on the other hand the switch 52 is closed the timing cycle of the timer 53 is restarted at point B in Fig. 1, and thus the solenoid 54 is not energized until the timing period designated generally by the letter A is reached.

To illustrate this, suppose that the bottles move successively into position at successive intervals of nine-tenths of one second. If the plug gauge 17 enters a bottle neck the control switch 52 is closed and restarts the timer so that the solenoid valve is not energized. On the other hand, if the plug gauge 17 is not permitted to enter a neck of a particular bottle the switch 52 will not be closed and the timing cycle already in progress will run out thereby energizing the solenoid valve 48. The next operation of the control switch 52 will again start the timer 53.

Operation of the timer 53 is synchronized with operation of the timing valve 18 so that the solenoid valve 48 will be energized, if the plug gauge 17 is not permitted to enter the neck of a bottle, immediately after the timing valve 18 causes the ware positioner and ejector 16 to be retracted. The time interval between retraction of the ware positioner and ejector 16 and operation of the solenoid valve 48 is such that the solenoid valve 48 causes the ware positioner and ejector 16 to be advanced when an imperfect bottle which did not permit the switch 52 to be closed has been moved by the conveyor 11 to a position immediately in front of the ware positioner and ejector 16. By this construction, it may be seen that any bottle which does not permit complete entry of the plug gauge 17 into its neck opening will be automatically ejected from the conveyor 11.

From the foregoing, it will be observed that the present invention provides novel bottle gauging apparatus operable to predeterminedly position a bottle beneath the gauging apparatus and automatically insert a plug of predetermined diameter into the neck opening of the bottle to determine whether or not the neck opening is sufficiently large and also to determine whether or not the neck of the bottle is vertical. Furthermore, it will be observed that the present invention provides novel bottle gauging apparatus operable to automatically reject a bottle which does not meet a predetermined standard.

While a particular embodiment of the present invention has been illustrated and described herein, it is not intended to limit the invention to such a disclosure and changes and modifications may be incorporated and embodied therein within the scope of the following claims:

I claim:

1. In apparatus for gauging the opening of a container, a conveyor for advancing the container past a gauging station; a gauge element mounted adjacent said conveyor at said station and displaceable to an inner limit position within the opening in the container, container positioning means at said station including a member normally disposed across the conveyor in the path of movement of said container to engage the same and predeterminedly position the opening thereof in registry with said gauge element, operating means to bias said gauge element to its inner limit position in said opening, and retract the same, said positioning means operable upon the completion of operation of said operating means to effect removal of the member from the path of the container to cause the conveyor to advance said container through said gauging station, said positioning means operable upon removal of said member to project the latter back across the conveyor into engagement with said container and eject the latter from said conveyor, and means rendered operable by movement of said gauge element to its inner limit position to delay the last-mentioned operation of the positioning means until the conveyor has advanced the container past the gauging station and out of the path of movement of said member.

2. In apparatus for gauging the openings of containers, a continuously operating conveyor for advancing a succession of containers past a gauging station, a reciprocal gauge element mounted adjacent said conveyor at said station and displaceable to an inner limit position within the opening in a container, container positioning means at said station including a member normally disposed across the conveyor in the path of movement of said containers to successively engage each container and predeterminedly position the opening thereof in registry with said gauge element, operating means to bias said gauge element to its inner limit position in said opening, and retract the same, said positioning means operable upon the completion of operation of said operating means to effect removal of the member from the path of the container to cause the conveyor to advance said container through said gauging station, said positioning means operable upon removal of said member to project the latter back across the conveyor into engagement with said container and eject the latter from said conveyor, and means rendered operable by movement of said gauge element to its inner limit position to delay the last-mentioned operation of the positioning means until the conveyor has advanced the container past the gauging station and out of the path of movement of said member, and before the advance of the next container of said succession into the gauging station.

3. In apparatus for gauging the opening of a container, a continuously operating apron conveyor for advancing the container past a gauging station, an elongated gauge element mounted adjacent said conveyor at said station and displaceable axially to an inner limit position within the opening in the container, guide means at said gauging station to engage and position said container laterally on said conveyor, container positioning means at said station including a member normally disposed across the conveyor in the path of movement of said container to engage the same and retain it against movement with the conveyor to position the opening thereof in axial registry with said gauge element, operating means to bias said gauge element to its inner limit position in said opening, and retract the same, said positioning means operable upon the completion of operation of said operating means to effect removal of the member from the path of the container to cause the conveyor to advance said container through said gauging station, said positioning means operable upon removal of said member to project the latter back across the conveyor into engagement with said container and eject the latter from said conveyor, and means rendered operable by movement of said gauge element to its inner limit position to delay the last-mentioned operation of the positioning means until the conveyor has advanced the container past the gauging station and out of the path of movement of said member.

4. In apparatus for gauging the opening of a container, a conveyor for advancing the container past a gauging station, a gauge element mounted adjacent said conveyor at said station and displaceable to an inner limit position within the opening in the container, container positioning means at said station including a member normally disposed across the conveyor in the path of movement of said conveyor to engage the same and predeterminedly position the opening thereof in registry with said gauge element, operating means to bias said gauge element to its inner limit position in said opening, and retract the same, switch means actuated by displacement of said gauge element to its inner limit position, said positioning means, upon the completion of operation of said operating means, operable to effect removal of the member from the path of the container to cause the conveyor to advance said container through said gauging station, said positioning means operable upon removal of said member to project the latter back across the conveyor into engagement with said container and eject the latter from said conveyor, and timing mechanism rendered operable by actuation of said switch means to delay the last-mentioned operation of the positioning means until the conveyor has advanced the container past the gauging station and out of the path of movement of said member.

5. In apparatus for gauging the opening of a container, a conveyor for advancing the container past a gauging station, a gauge element mounted adjacent said conveyor at said station and displaceable to an inner limit position within the opening in the container, a limit switch actuated by displacement of said element to said inner limit portion, container positioning means at said station including a member normally disposed across the conveyor in the path of movement of said container to engage the same and predeterminedly position the opening thereof in registry with said gauge element, operating means to bias said gauge element to its inner limit position in said opening, and retract the same, said positioning means first operable upon the completion of operation of said operating means to effect removal of the member from the path of the container to cause the conveyor to advance said container through said gauging station, said positioning means secondly operable upon removal of said member to project the latter back across the conveyor into engagement with said container and eject the latter from said conveyor, a rotary timing valve effecting successively the operation of said operating means, the first operation of said positioning means, and the second operation of said positioning means, and timing mechanism rendered operable by actuation of limit switch to delay the last-mentioned operation of the positioning means until the conveyor has advanced the container past the gauging station and out of the path of movement of said member.

6. In apparatus for gauging the openings of containers, a continuously operating apron conveyor for advancing a succession of containers past a gauging station, an elongated gauge element mounted for axial reciprocation adjacent said conveyor at said station and displaceable to an inner limit position within the opening in a container, a limit switch actuated by displacement of said element to said inner position, guide means at said gauging station to engage and position the containers laterally on said conveyor, conveyor positioning means at said station including a member normally disposed across the conveyor in the path of movement of said containers to successively engage each container and retain it against movement with the conveyor to predeterminedly position the opening thereof in axial registry with said gauge element, operating means to bias said gauge element to its inner limit position in said opening, and retract the same, said positioning means first operable upon the completion of operation of said operating means to effect removal of the member from the path of the container to cause the conveyor to advance said container through said gauging station, said positioning means secondly operable upon removal of said member to project the latter back across the conveyor into engagement with said container and eject the latter from said conveyor, a rotary timing valve effecting successively the operation of said operating means, the first operation of said positioning means, and the second operation of said positioning means, and timing mechanism rendered operable by actuation of said limit switch to delay the last-mentioned operation of the positioning means until the conveyor has advanced the container past the gauging station and out of the path of movement of said member, and before the advance of the next container of said succession into the gauging station.

References Cited in the file of this patent

UNITED STATES PATENTS

| | | |
|---|---|---|
| 1,743,018 | Magnusson | Jan. 7, 1930 |
| 1,999,827 | Wardley | Apr. 30, 1935 |
| 2,059,177 | Ohrn | Oct. 27, 1936 |
| 2,286,523 | Whitehead | June 16, 1942 |
| 2,352,091 | Fedorchak | June 20, 1944 |
| 2,371,748 | Fedorchak | Mar. 20, 1945 |
| 2,407,062 | Darrah | Sept. 3, 1946 |
| 2,549,004 | Pomeroy | Apr. 17, 1951 |
| 2,596,342 | McNutt | May 13, 1952 |